United States Patent [19]
Wong, Jr.

[11] 3,868,787
[45] Mar. 4, 1975

[54] APPARATUS FOR SUPPORTING HYDROPONICALLY GROWN PLANTS

[75] Inventor: Edward Wong, Jr., Los Angeles, Calif.

[73] Assignee: Weingarten & Wong Enterprises, Inc., Los Angeles, Calif.

[22] Filed: July 2, 1973

[21] Appl. No.: 375,651

Related U.S. Application Data

[63] Continuation of Ser. No. 213,330, Dec. 29, 1971, abandoned, which is a continuation-in-part of Ser. No. 15,558, March 2, 1970, Pat. No. 3,660,933.

[52] U.S. Cl. .................. 47/1.2, 47/45, 47/41.13
[51] Int. Cl. ............................................. A01g 31/02
[58] Field of Search .............. 47/1.2, 34, 38–38.1, 47/41.11, 41.12, 41.13

[56] References Cited
UNITED STATES PATENTS
3,018,586  1/1962  Farley ................................. 47/1.2
FOREIGN PATENTS OR APPLICATIONS
1,080,204  12/1954  France Primary Examiner—Robert E. Bagwill
Attorney, Agent, or Firm—Fraser and Bogucki

[57] ABSTRACT

A holder for supporting hydroponically cultivated plants includes a receptacle having a tapered interior wall surface and an open bottom through which the plant stem is adapted to extend into a supply of aqueous nutrient solution. Yieldable inserts, typically of foam plastic, are carried by the receptacle, the inserts having outer surfaces engaging the interior wall of the receptacle and inner surface adapted to engage the plant stem to support the plant both laterally and vertically. Additional vertical support is provided by a stirrup coupled to and depending from the receptacle. The stirrup, which may be in the form of a wire coil or a wire-mesh strap or cylindrical cage, has a lower portion shaped to engage and support the lower extremity of the plant stem. The portion of the receptacle above the yieldable inserts may be at least partially filled with particulate filler material, such as pea gravel, for additional lateral support of the plant.

17 Claims, 11 Drawing Figures

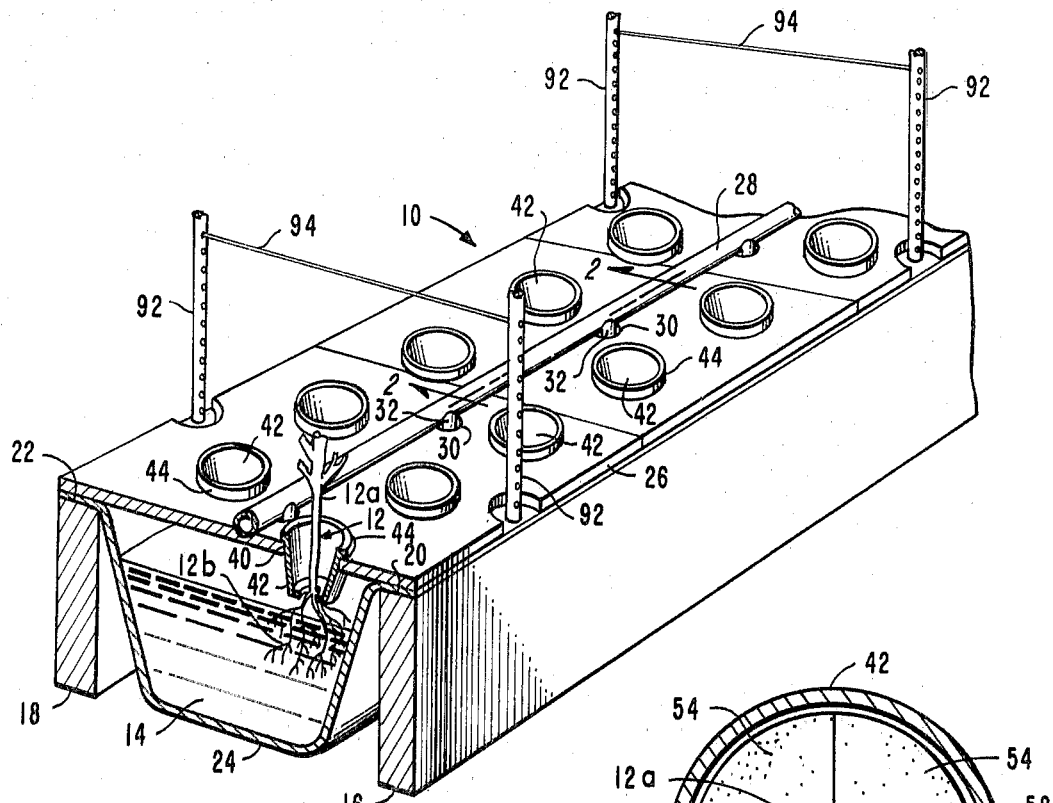
FIG.—1
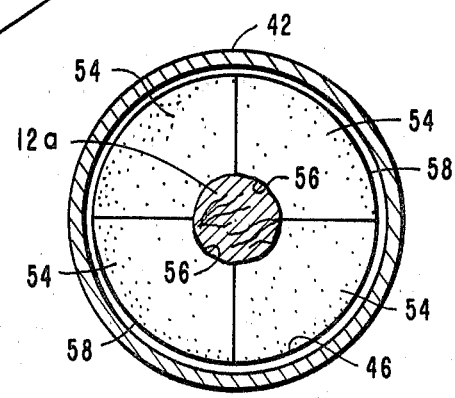
FIG.—4
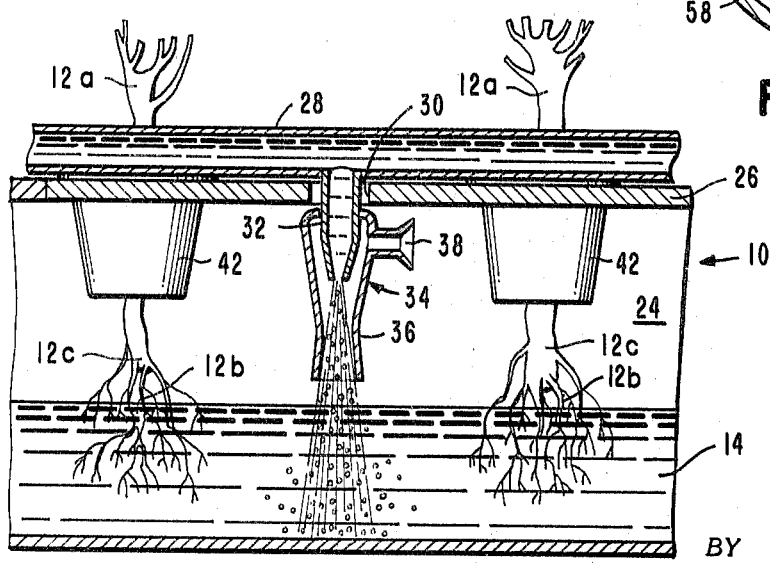
FIG.—2
INVENTOR.
EDWARD WONG, JR.
BY
FRASER AND BOGUCKI
ATTORNEYS

INVENTOR.
EDWARD WONG, JR.
BY
FRASER AND BOGUCKI
ATTORNEYS

３,868,787

APPARATUS FOR SUPPORTING HYDROPONICALLY GROWN PLANTS

CROSS REFERENCE TO RELATED APPLICATIONS

This application is a continuation of application Ser. No. 213,330 filed by the present inventor on Dec. 29, 1971, now abandoned, which in turn is a continuation-in-part of application Ser. No. 15,558 filed by the present inventor on Mar. 2, 1970 and entitled "Hydroponics System And Method", now U.S. Pat. No. 3,660,933 issued May 9, 1972.

BACKGROUND OF THE INVENTION

1. Field of the Invention

This invention relates generally to hydroponics, that is, the propagation of plant growth by means of an aqueous nutrient solution, and more particularly to apparatus for supporting plants grown by the hydroponic method.

2. Description of the Prior Art

In certain hydroponic systems of the prior art individual plants extend through supports in the form of stoppers of split cork or like material held in place within apertures in a lid over the nutrient solution container. Although these supports are satisfactory for plants whose overall weight and stem diameter do not significantly increase during growth, plants which grow substantially tend to slip down into the nutrient solution as their weight increases. Once the crown, that is, the region of the plant at which the stem and roots merge, becomes submerged the plant dies. Further, these supports generally do not have sufficient lateral resilience and therefore do not allow for substantial increases in stem diameter during plant growth.

In other arrangements of the prior art, plant seeds are germinated on a folded or wound cellulosic pad permanently wetted by capillary action through a wick extending from the pad into a reservoir of nutrient solution below. The stem of the growing plant is held between the vertically extending layers of the cellulosic pad. Although ample resiliency to accommodate stem enlargement is provided, these arrangements furnish little vertical support. Also, lateral support must be supplied completely by means of auxiliary framing or wire or lattice work adjacent the growing plant and to which the plant is attached. The foregoing devices do not lend themselves to reuse and thus considerable maintenance and expenditure of time and money is required each time a new crop is grown.

Another class of support system is typified by a large wire basket containing a layer of excelsoir or similar material supporting a plurality of plants above the nutrient solution level. Although adequate vertical support is thus furnished, lateral support of the stem is minimal thereby limiting this technique to cultivation of relatively small plants.

Besides limitations in the size and weight of the plants that can be accommodated, none of the foregoing devices are amenable to plant cultivation on a large scale, commercial basis.

SUMMARY OF THE INVENTION

The present invention is concerned with devices for providing firm vertical and lateral support and these devices are particularly useful for supporting plants, such as tomato plants, which have a very large increase in size and weight during maturation. Devices of the present invention are further characterized by means for providing firm vertical support and yieldable lateral support means to accommodate enlargement of the plant stem diameter. Furthermore, support devices of the invention facilitate removal of the plants after harvesting and are readily prepared for receiving the next crop thus permitting their repeated use in hydroponics farm systems designed for large scale, commercial production.

In accordance with certain of the broad structural aspects of the present invention, there is provided an open-topped receptacle adapted to be held in proper relation to a supply of nutrient solution and having an opening in the bottom through which the plant stem can extend downwardly toward the nutrient solution. A plurality of resiliently yieldable inserts are disposed in the receptacles and have first or outer surfaces engaging the interior wall surface of the receptacle and second or inner surfaces for engaging the plant stem. The inserts thereby provide firm lateral support and yield and deform as necessary to accommodate the increasing diameter of the stem during growth.

Further lateral support can be provided by at least partially filling the space above the inserts with particulate filler material which, while providing additional lateral support, does not impede the growth of the stem.

According to another broad aspect of the present invention, supplemental vertical support for the plant is derived from a stirrup depending from the receptacle and including a lower seat adapted to receive and be engaged by the lower extremity of the plant stem.

More specifically, the receptacle has a generally circular transverse cross section with interior and exterior wall surfaces that taper inwardly toward the bottom. At its upper extremity, the receptacle has an outwardly extending flange from which the receptacle may be suspended from a suitable platform above the nutrient solution supply. An inwardly directed shoulder at the lower end of the receptacle is provided for retaining the stirrup. Because of the taper of the interior wall surface, a locking or jamming action is provided with the inserts tending to restrain the stem from moving downwardly into the nutrient solution. On the other hand, the inserts retain sufficient resiliency to yield laterally and thereby accommodate a significant degree of stem growth. Thus, both lateral and vertical support are furnished by the combination of the receptacle shape and the utilization of the described inserts. Eventually, the plant reaches a size at which the inserts become ineffective; at that point vertical support is provided by the stirrup and the upper portion of the plant is supported laterally by means of stanchion and wire support means, or the like.

Further in accordance with specific features of the invention, the stirrup may take a number of forms. For example, the stirrup may comprise a helically wound wire the upper portion of which is received and retained, in interlocking fashion, by the inwardly extending shoulder at the lower extremity of the receptacle. The lower end of the wire is bent so as to be directed horizontally and approximately diametrically across the coil. The lower end of the plant stem may thus rest on the horizontal end portion of the coil and the pitch of the coil is such that sufficient space (for example, at least ¼ inch) exists between adjacent turns of the coil to facilitate passage of the roots and preclude clogging thereof inside the coil.

As an alternative, the coil may be tapered to have a smaller diameter at the lower end, the lower extremity of the plant stem in this case being received and held by the lowermost turns of the coil.

Other forms of the stirrup in accordance with specific forms of the invention are based upon the use of wire mesh either in the form of a U-shaped strap or a cylindrical cage suspended from the shoulder at the lower end of the receptacle.

BRIEF DESCRIPTION OF THE DRAWINGS

Further objects, advantages and features of the invention will become evident from the ensuing detailed description which makes reference to the accompanying drawings, in which:

FIG. 1 is a perspective view of a portion of a trough of a hydroponic system employing support devices according to the present invention, certain parts having been omitted for clarity;

FIG. 2 is a perspective view of a portion of the trough of FIG. 1 as seen along the plane 2—2;

FIG. 4 is a transverse, cross-section view of the receptacle of FIG. 3 as seen along the plane 4—4;

DETAILED DESCRIPTION OF THE INVENTION

Figure 3:
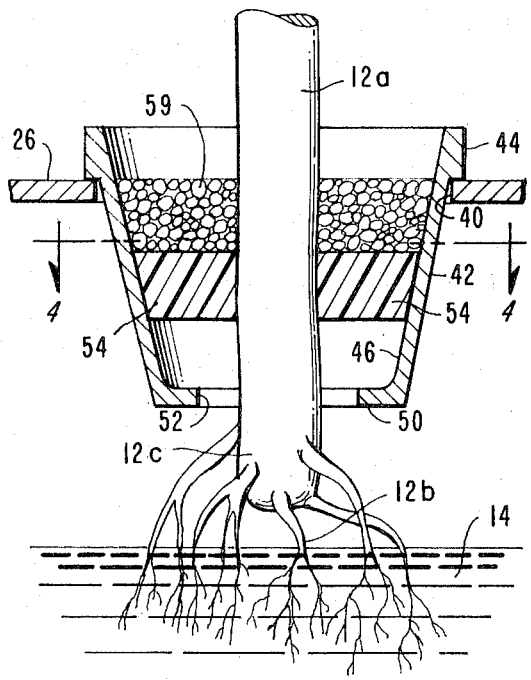
FIG. 3 is an elevation view, in section, of a plant receptacle showing certain aspects of the present invention.

With reference to FIGS. 1-4 of the drawings, there is shown a portion of a trough 10 forming a part of a hydroponic system such as that described in the above-referenced, copending application Ser. No. 15,558. The trough 10 supports plants 12, having stems 12a, roots 12b and crowns 12c, in proper relation with respect to aerated nutrient solution 14 flowing within the trough.

Broadly, the system of the above-referenced copending application Ser. No. 15,558 comprises a series of troughs, substantially identical to the trough 10, arranged in spaced, parallel relation and individually supplied with aqueous nutrient solution from a common reservoir. The solution flows from the discharge ends of the troughs back to the reservoir via a return conduit.

The trough 10 comprises a pair of parallel, spaced, vertical walls 16 and 18 which may be fabricated of any suitable, durable material, for example, wood, steel, concrete or the like. The side walls 16 and 18 have horizontal, coplanar upper edges 20 and 22, respectively. Suspended between the side walls 16, 18 and supported by the upper edges 20, 22 thereof and the ground intermediate the side walls, is an open channel 24 running the length of the trough 10 and within which the nutrient solution 14 flows. In one practical embodiment of the trough under discussion, the channel 24 is formed of heavy polyethylene sheet, although it will be apparent that other materials resistant to attack by the solution flowing in the trough 10 may be utilized.

Spanning the upper edges 20, 22 of the side walls 16, 18 is a platform 26 which may be conveniently fabricated in sections and constructed of hardboard, wood, or the like. The platform 26 serves several purposes: it helps to firmly secure the upper edges of the polyethylene sheet defining the channel 24 and forms the support for both the plants to be grown and a branch pipe 28 feeding nutrient solution to the trough 10.

The branch pipe 28, which is connected to a main supply conduit (not shown) at one end closed off at the other end, is preferably positioned so as to rest on the platform 26 approximately along the longitudinal center line thereof. Spaced at uniform intervals along the branch pipe 28 and projecting downwardly therefrom through apertures 30 formed in the platform 26, are a series of nozzles 32 for discharging streams of nutrient solution into the trough 10 below. According to one practical example of the invention, each branch pipe is about 80 feet in length with outlet nozzles spaced every 8 feet. The branch pipe is made of 1 ¼ inches PVC (polyvinyl chloride) plastic piping which is relatively inexpensive and resists corrosion. Further, by laying the branch pipe 28 on top of the platform 26, installation and maintenance are greatly simplified.

Each outlet nozzle 32 carries an aspirator or eductor 34 for introducing air into the stream flowing from the discharge nozzle 32. Each eductor 34 has a reduced diameter section 36 and an air inlet 38 upstream thereof. The nutrient solution discharges from each nozzle 32 at a relatively high velocity as a result of the pressurization produced by the supply pump (not shown) and a reduced pressure zone is formed within the constricted section 36 in accordance with well known principles of fluid dynamics. Air is thereby drawn through the inlet 38 and entrained by the solution. In this fashion, the nutrient solution 14 is aerated uniformly along the entire length of the trough 10. The nutrient solution streams issuing from the nozzles 32 furthermore agitate and thoroughly mix the aerated solution 14 in the trough 10 to insure substantially complete uniformity of nutrient concentration and air content throughout all portions of the trough.

The described aeration system eliminates the need for separate air supply and pressurization equipment and thus greatly reduces the cost and maintenance of the system. Further, since the aeration of the nutrient solution is uniform along the entire length of the trough, the yield of each trough is maximized making practical the use of relatively long troughs capable of producing extremely high yields for a given acreage. Plants may thus be cultivated by the hydroponics method on a large scale, commercial basis and the grower can take advantage of relatively cheap land, such as desert areas, where the climate permits farming on a continuous basis with no seasons to limit the number of crops grown annually.

The platform 26 has a pair of longitudinally extending, parallel rows of circular openings 40 for receiving plant receptacles 42. Each receptacle 42 has a generally circular transverse cross-section, an open top and an outwardly extending flange 44 at the upper end. The outer diameter of the flange 44 is somewhat larger than the diameter of the opening 40 in the platform 26 in which the receptacle is received. Each receptacle 42 further includes an interior wall surface 46 tapering inwardly toward the bottom of the receptacle. The bottom of the receptacle includes an inwardly directed, annular shoulder 50 defining an opening 52 through which the plant stem 12a extends.

According to one practical example, the outside diameter of the upper flange 44 of the receptacle 42 may be about 3 ⅜ inches, with an outside diameter at the bottom extremity of about 2 ¼ inches. The opening 52 in the bottom is approximately 1 ½ inches in diameter and the overall height of the receptacle is about 2 ½ inches. The trough 10 is dimensioned and the nutrient solution 14 is maintained at such a level that the roots 12b of the plant are constantly immersed in the nutrient solution but not to the extent that the crown 12c is submerged. The level of the nutrient solution within the trough 10 is typically maintained at about 5 inches. This level is controlled by an adjustable overflow gate arrangement disclosed in the afore-mentioned copending application.

Each plant 12 is supported securely both laterally and vertically within the receptacle by resilient insert means which may take the form of a plurality of circumferentially disposed foam plastic elements 54 (FIG. 4). Although four inserts 54 are shown in FIG. 4, it will be appreciated that more or less of these elements may be employed so long as adequate support is furnished. The inserts include inner and outer surfaces 56 and 58, respectively, which engage the plant stem 12a and receptacle wall surface 46, respectively.

As the plant grows heavier, the tendency for it to slip downwardly is resisted by the inserts 54 which become wedged between the stem 12a and the wall surface 46. Furthermore, as the stem diameter increases, the plastic inserts resiliently yield to compensate for the diametric enlargement without damage to the plant or the necessity of having to replace the inserts with ones of different sizes to accommodate the larger stem.

For additional lateral support, an inert, particulate filler material 59, such as fine aggregate, natural gravel, mechanically crushed rock, or the like, may be added to each receptacle above the plastic inserts. The inserts 54 are abutting, or closely spaced, as in FIG. 4, to prevent the filler material from passing through and the weight of the filler helps to hold the inserts 54 in place. The filler material, while providing additional support, does not impede the diametric growth of the stem. Mechanically crushed gravel commonly known as pea gravel having an average particle size of ¼ inch has been used with success.

The present invention also provides a stirrup means suspended or depending from the lower extremity of the receptacle 42, the stirrup having an upper portion adapted to be coupled to the receptacle and a lower portion forming a seat for the stem of the plant.

Figure 5:
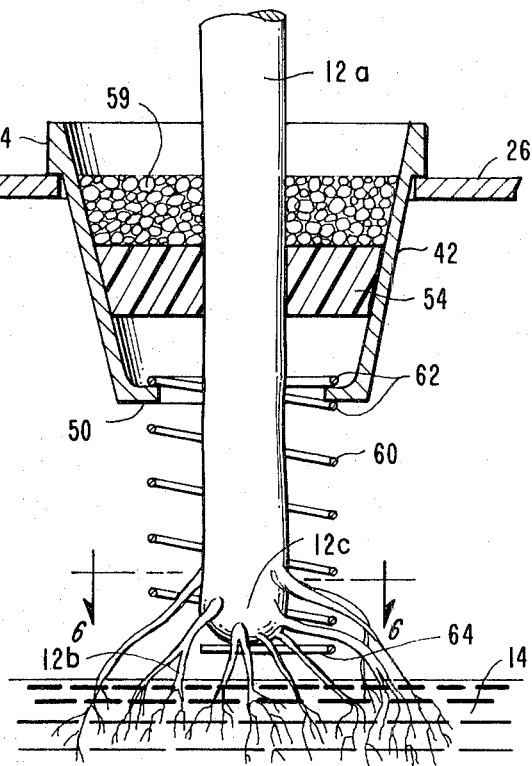
FIG. 5 is an elevation view, in section, of a plant receptacle in accordance with another embodiment.
Figure 6:
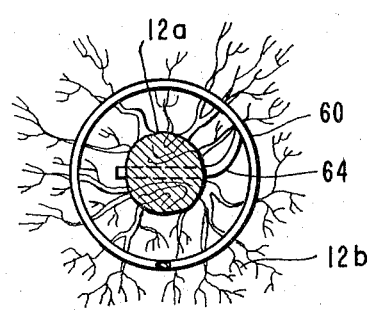
FIG. 6 is a view of a transverse section of the receptacle of FIG. 5 as seen along the plane 6—6.

FIGS. 5 and 6 show a first embodiment of a stirrup means according to the invention. In this embodiment, the stirrup means comprises a vertically-oriented, helical wire coil 60 having a series of spaced turns. The upper turns 62 of the coil engage, in interlocking fashion, the inwardly directed shoulder 50 of the receptacle 42. The turns of the coil 60 have substantially the same diameter throughout the length of the coil and are spaced at least about ¼ inch, and preferably ½ inch, apart so as not to cause clogging of the roots 12b within the coil or impede the roots from passing through to the nutrient solution. In one practical example, the coil has an overall length of about 2 ½ inches, and is made of steel wire approximately 0.1 inch in diameter. The overall diameter of each of the turns is about 1 ¾ inches. The lower end portion 64 of the coil is turned inwardly approximately along a diameter of the coil so as to form a seat for the lower extremity of the stem 12a.

Figure 7:
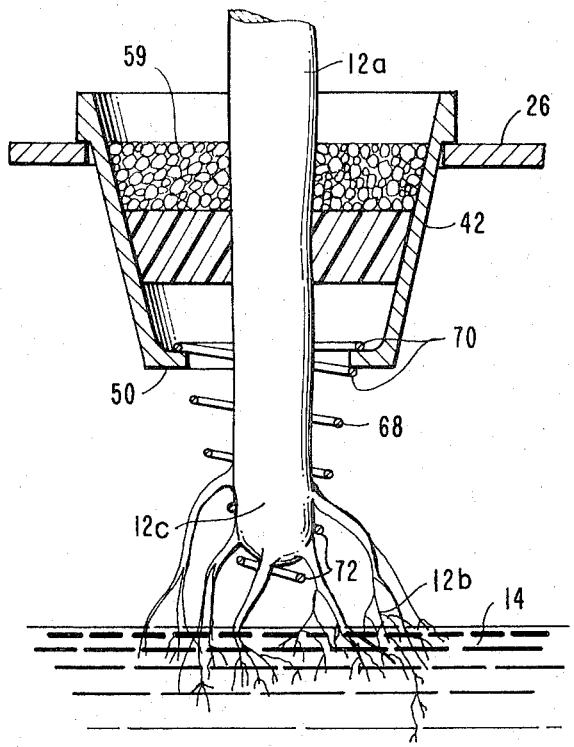
FIG. 7 is an elevation view, in section, of a plant receptacle according to yet another embodiment of the present invention.

Turning now to FIG. 7, another embodiment of the stirrup support means is shown which is similar to the embodiment of FIGS. 5 and 6. In this embodiment, the stirrup takes the form of a wire coil 68 tapering inwardly toward the lower end. As in the embodiment of FIGS. 5 and 6, the upper turns 70 grip the shoulder 50. The lower turns 72 which have relatively small diameters, engage the lower extremity of the stem 12a to provide a seat for the plant. The spacing between adjacent turns of the coil 68 is approximately the same as mentioned above, that is, at least about ¼ inch and preferably of the order of ½ inch.

Figure 8:
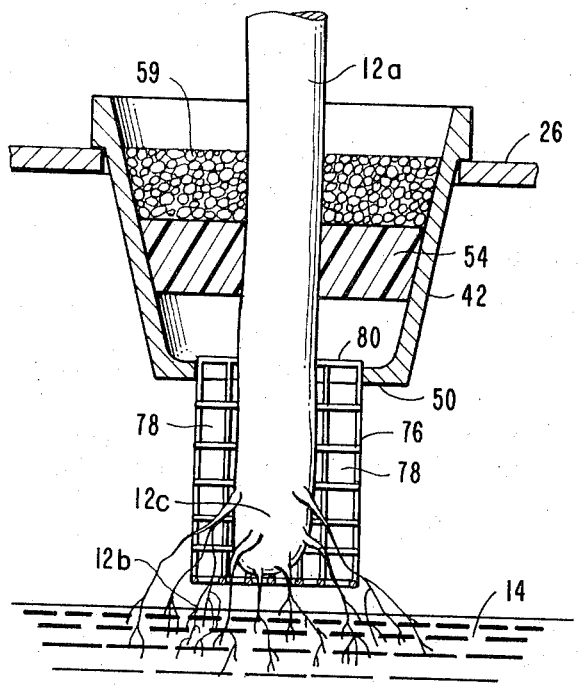
FIG. 8 is an elevation view, in cross section, of a plant receptacle in accordance with still a further embodiment of the present invention.
Figure 9:
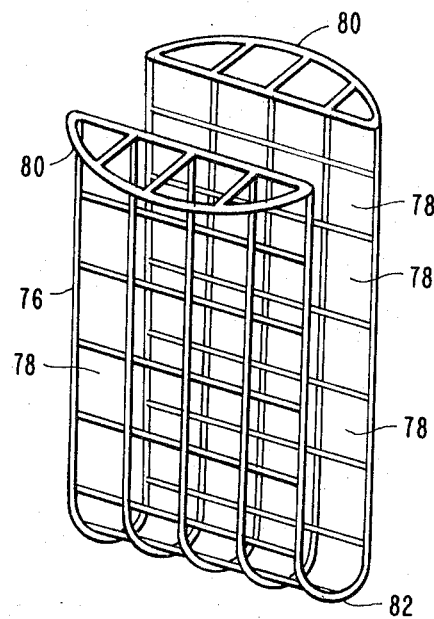
FIG. 9 is a perspective view of the stirrup element employed in the embodiment of FIG. 8.

The stirrup support means may also be fabricated of wire mesh and two practical examples of such an approach are shown in FIGS. 8-11. In FIGS. 8 and 9, a wire mesh support 76 has a U-shaped configuration with vertical and horizontal wires defining openings 78 at least about ¼ inch, and preferably about ½ inch, in width and height. At the upper extremity of the support 76 are tabs 80 oriented horizontally to engage the upper surface of the inwardly directed shoulder 50 of the receptacle 42. As shown in FIG. 8, the stem 12a rests on the lower, arcuate portion 82 of the support 76 with the roots 12b extending both through the mesh itself and through the open sides of the support.

Figure 10:
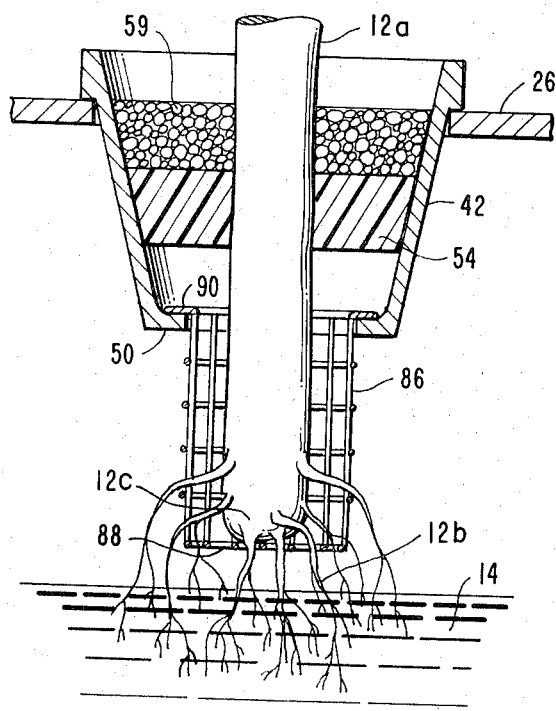
FIG. 10 is an elevation view, in section, of a plant receptacle according to another alternative embodiment of the invention.
Figure 11:
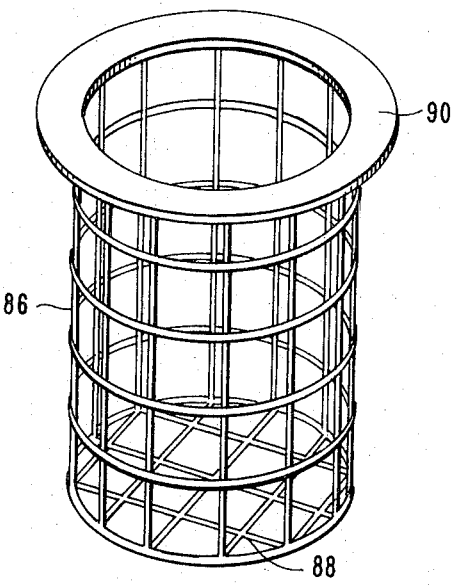
FIG. 11 is a perspective view of the stirrup device employed in the embodiment of FIG. 10 showing the details thereof.

In FIGS. 10 and 11, a wire mesh support 86, having openings of the same size as that described in connection with the embodiment of FIGS. 8 and 9, has a cylindrical configuration with a bottom surface 88 also defined by wire mesh. The upper extremity of the cylindrical support 86 has an outwardly extending flange 90 which seats on the upper surface of the inwardly directed shoulder 50 of the receptacle 42. The lower end at the stem 12a rests on the horizontal bottom 88.

The plants are initially cultivated from the seed either hydroponically or in soil for a short period of time. The young seedlings, which are now large enough so that their roots will reach and become immersed in the nutrient solution, are transferred to the receptacles 42 where their remaining growth takes place. The inserts 54 and gravel 59 are typically used only when the plant is young and subject to being blown over by the wind. As the plant grows and its stem expands to the size of the coil or wire mesh stirrup, sufficient support is provided thereby and the inserts 54 and gravel 59 may be removed. To provide lateral support for the upper portions of the plants, which in the case of tomatoes will grow 7 or 8 feet tall, stanchions 92 and transverse wires 94 (FIG. 1) attached thereto may be utilized, the stanchions being secured to the side walls 16 and 18.

Because the receptacles 42 of the invention are separable from the platform 26, removal of the root structure after harvesting is facilitated. Each receptacle is lifted and the roots are cut from the plant. After all of the plants and their roots have been separated along a given trough, the entire root structure, which is a tightly interwoven mass, is removed as a single entity from the discharge end of the trough. Since the root mass has buoyancy, its removal is relatively easy and does not require much force. The receptacles may then be prepared for re-use.

What is claimed is:

1. For use in a hydroponic system, plant-holding means including:
   a receptacle for holding an individual plant having a stem, said receptacle having an inner side wall surface, an open top and an open bottom portion through which said stem is adapted to extend; and
   means for supporting said plant laterally including yieldable means engaging said inner side wall surface and adapted to engage said stem and means for supporting said plant vertically, said vertically supporting means including a stirrup depending from said receptacle, said stirrup having an upper portion coupled to said receptacle and a lower portion forming a seat for the lower extremity of said plant stem.

2. A plant-holding means, as defined in claim 1, in which:
   said receptacle includes an inwardly extending shoulder in said bottom portion, said upper portion of said stirrup being configured to engage said shoulder.

3. A plant-holding means, as defined in claim 2, in which:
   said stirrup is in the form of a coil of wire the upper turns of which grip said shoulder.

4. A plant-holding means, as defined in claim 2, in which:
   said stirrup is formed of a wire mesh the upper portion of which includes an outwardly extending flange engaging said shoulder.

5. For use in a hydroponic system, plant-holding means including:
   a receptacle for holding an individual plant and adapted to receive the stem of said plant, said receptacle having a generally circular transverse section and having an open top and an open bottom and an interior wall tapering inwardly toward said bottom, said receptacle further including flange means extending outwardly from the upper extremity thereof for engaging a receptacle-holding platform and shoulder means extending inwardly at the bottom extremity thereof;
   means for supporting said plant both laterally and vertically including a plurality of circumferentially disposed yieldable inserts within said receptacles, said inserts having first surfaces engaging said interior wall of said receptacle and second surfaces engaging said stem, said inserts being wedged between said interior wall and said stem to resist downward movement of the plant and adapted to yield and deform to accommodate the increasing size of said stem during growth of said plant; and
   means for providing supplemental support for said plant including a vertically-oriented wire coil having a series of spaced, helical turns, the turns adjacent the upper extremity of said coil engaging said inwardly extending shoulder on said receptacle, the lower extremity of said coil including a portion configured to be engaged by the lower extremity of said stem to thereby provide said supplemental support.

6. A plant-holding means, as defined in claim 5, in which:
   said turns of said wire coil have a substantially uniform diameter along the length of said coil, the stem-engaging portion of said coil comprising a length of the lower extremity of said wire directed generally diametrically across said coil.

7. A plant-holding means, as defined in claim 5, in which:
   particulate filler material is disposed over said yieldable inserts for providing additional lateral support of said plant and for holding said inserts in place.

8. In a hydroponic system for growing large plants, said system including means for containing nutrient solution, a plurality of plant receptacles including means associated therewith for providing vertical support for said plants, said receptacles defining a growing area, means operatively associated with said solution-containing means for supporting said receptacles in relation to said nutrient solution, and means operatively associated with said solution-containing means and positioned generally over said growing area for providing lateral support for said plants, the improvement in which:
   said receptacle is adapted to receive the stem of said plant and has an open top and an open bottom through which said stem is adapted to extend; and
   a stirrup depends from said receptacle, said stirrup having an upper portion coupled to said receptacle and a lower portion forming a seat for the lower extremity of said plant stem.

9. The invention, as defined in claim 8, in which:
   said stirrup comprises a wire coil having a lower seat portion upon which said plant stem rests.

10. The invention, as defined in claim 8, in which:
    said stirrup is formed of wire mesh having a lower portion adapted to receive and support said plant stem.

11. The invention, as defined in claim 10, in which:
    said wire mesh has generally square mesh openings of at least one-quarter inch on a side.

12. The invention, as defined in claim 10, in which:
    said wire mesh has a generally U-shaped configuration, the lower, arcuate portion thereof adapted to support said plant stem.

13. The invention, as defined in claim 10, in which:
    said wire mesh is in the shape of a cylindrical cage having a lower, horizontal portion adapted to support said plant stem.

14. In a hydroponic system, said system including means for containing nutrient solution, at least one receptacle for receiving a plant and including means for providing support for said plant, means operatively associated with said solution-containing means for supporting said receptacle in relation to said nutrient solution, and means positioned in relation to said receptacle for laterally supporting portions of the plant above said receptacle, the improvement in which:
    said receptacle has an open lower end and includes an inwardly directed flange at said lower end; and
    a stirrup depends from said receptacle, said stirrup comprising a wire coil, upper turns of said coil engaging said inwardly directed flange of said receptacle, said coil having a lower end forming a seat for said plant stem.

15. The invention, as defined in claim 14, in which: the turns of said wire coil have a substantially uniform diameter along the length of said coil, said lower portion of said coil including a length of said wire directed generally diametrically across said coil for providing said seat portion.

16. The invention, as defined in claim 15, in which: said wire coil tapers inwardly toward said lower portion, the smaller diameter turns in said lower portion being dimensioned to receive and support the lower extremity of said plant stem.

17. The invention, as defined in claim 14, in which: adjacent turns of said wire coil are spaced at least ¼ inch apart.

* * * * *